Sept. 4, 1945.  H. DEUTSCH  2,384,285
UTILITY BAG
Filed March 8, 1944
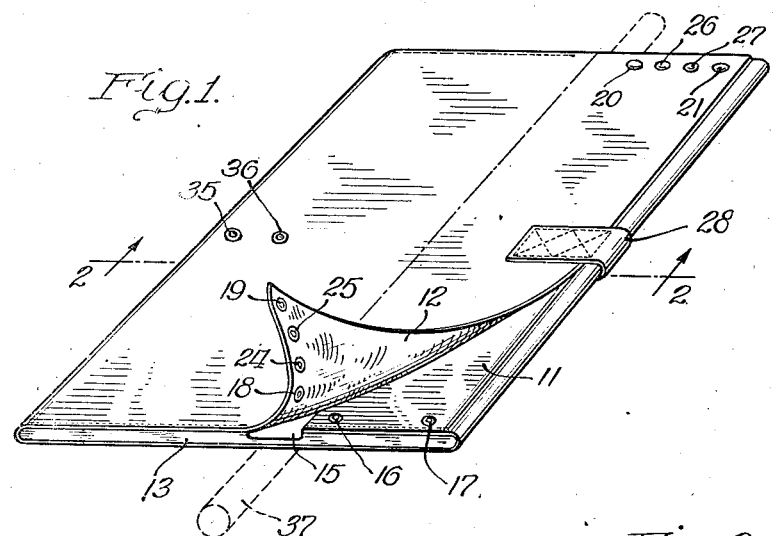
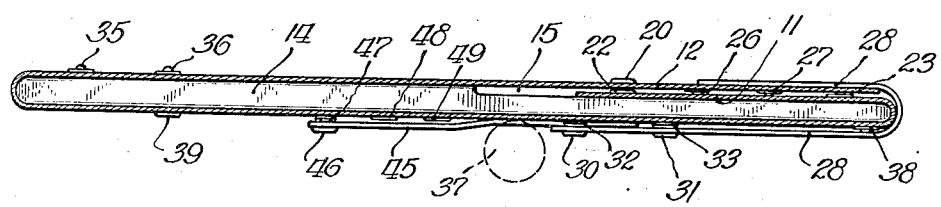
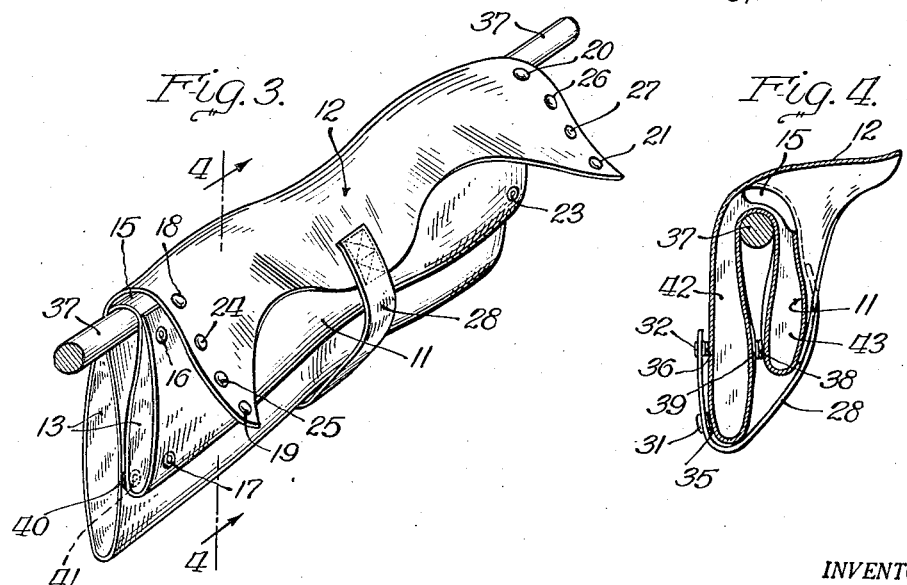
INVENTOR.
Hans Deutsch
BY
George A. Auer
Atty.

Patented Sept. 4, 1945

2,384,285

UNITED STATES PATENT OFFICE 2,384,285

UTILITY BAG

Hans Deutsch, Chicago, Ill.

Application March 8, 1944, Serial No. 525,553

8 Claims. (Cl. 2—17)

This invention relates to utility bags, and is particularly concerned with a bag adapted for protective purposes in the manner of a muff, for use in manipulating the handles or steering bars of vehicles and the like, and also for general use as a receptacle of articles.

The principal object is concerned with the creation of a bag which combines the advantages of simplicity in manufacture with numerous possibilities for use.

The new bag may be made of a single piece of suitable sheet material folded upon itself and joined in such a manner as to form a single compartment structure which is adapted for ready conversion into a multi-compartment structure. The bag in either form may be utilized in desired manner as a carrier of articles. The utility of the new bag is enhanced by features which adapt it for use as a protective muff in connection with handles of vehicles, e. g., baby carriages. The last noted features also adapt the bag for ready attachment to an object such, for example, as a hand rail of the type provided in the rear of front seats of automobiles and, conversely, they provide means on the bag for attaching thereto auxiliary articles, e. g., an umbrella, a package of fabric or paper and the like.

These and other objects and features will appear from the detailed description of an embodiment of the invention, which is presented below with reference to the accompanying sheet of drawings. In the drawing, Fig. 1 is an elevational perspective view of an example of a bag made in accordance with the invention;

Fig. 2 represents the new structure on an enlarged scale in sectional view taken approximately along lines 2—2 of Fig. 1;

Fig. 3 shows a perspective view of the new bag when used as a protective muff in connection with the handle or steering bar of a vehicle; and Fig. 4 illustrates the structure Fig. 3 in section taken approximately along lines 4—4 of Fig. 3.

Like parts are indicated by like reference numerals throughout the drawing. Elements and details which are well known will be described only to the extent required to convey an understanding of what is considered new.

The illustrated structure is made of a single piece of sheet material folded upon itself as shown in Figs. 1 and 2, to form an elongated principal compartment. Any suitable and desired, preferably pliable, material may be used, including leather, fur, fabric or cloth, felt, or synthetic or plastic material. Care must be taken, however, to select material sufficiently pliable and of a type adapted for the purposes to which the bag is to be put, as described herein.

The sheet of material is folded upon itself in such a manner as to form on one side a substantially uninterrupted wall, and on the other side a wall comprising an opening 15 formed by the fixed closure 11 in coaction with the cover flap 12. Side or end walls 13, 14 may be provided if desired. The edges of the folded sheet may also be joined in any desired and approved manner, e. g., by sewing or stitching. Suitable fasteners 16, 17 are provided on the closure 11 for coaction with companion fasteners carried on the inside of the cover 12. Fasteners 16, 17 coact, for example, with the fasteners 18, 19 at one end of and on the inside of the cover flap 12. Fasteners including those shown at 20, 21 at the opposite end of the structure coact with similar fasteners 22, 23 provided at the corresponding end of the closure 11. Additional fasteners 24, 25 and 26, 27 are carried by the cover 12 so as to obtain greater flexibility and freedom of adjustment. These additional fasteners may, of course, be provided on the closure 11 instead of on the cover flap as shown.

The structure may thus be closed by securing the free end of the sheet of material, which forms the cover flap 12, in position on the fixed end forming the closure 11, as shown in Figs. 1 and 2. Access may be gained to the interior compartments by releasing the fasteners and raising the cover flap 12 to expose the elongated opening 15.

A strap 28 is in suitable manner attached to the cover flap 12. The free end of this strap is provided with fasteners 30, 31 for coaction with companion fasteners 32, 33, as shown in Fig. 2. The strap 28 constitutes an additional centrally positioned fastening means.

The new bag, so far as described, may be used in the manner of a hand bag, brief case and the like. A suitable handle may be provided on the bag at any desired place, e. g., along the dot-dash line in Fig. 1, or along one of the transverse ends. The bag may also be used in such form as a storage receptacle for blankets, bedding or the like. The latter use is indicated when the bag is intended as an auxiliary in connection with baby carriages.

If the bag is used for storing a blanket or a robe to be taken along in an automobile or the like, it may be folded over the hand rail usually provided in such vehicles on the rear of the front seat, in the manner indicated in Figs. 3 and 4, and may be secured in place by certain fastening means which will be presently described, or by attaching the fasteners 30, 31 of the strap 28 in coaction with the fasteners 35, 36. The cover flap 12 may, of course, be closed as previously explained. It is shown open in Figs. 3 and 4 for a reason which will appear later on. Numeral 37 indicates a member which may be the hand rail or other object over which the bag is folded as indicated.

The structure may also be used in the form of a double compartment bag or carrier case. It is converted to such use simply by folding the uninterrupted wall of the bag upon itself, e. g., along the dot-dash line indicated in Fig. 1 (axis of object 37) to obtain the configuration generally apparent from Figs. 3 and 4. The two sections folded upon one another are joined at one end by fasteners 38, 39 (Figs. 2 and 4), and at the other end by similar fasteners 40, 41 (Fig. 3). Two compartments 42, 43 (Fig. 4) are now available, one disposed in parallel with the other, and both are accessible by way of the opening 15. The cover flap 12 and the strap 28 are manipulated in the manner described before. The two compartment sections 42, 43 are secured together and remain in mutually secured position incident to releasing the strap and the cover flap. The two compartments are shown of unequal depth, compartment 42 being deeper than compartment 43. This has been done for the sake of convenience, and presents certain advantages.

The use of the bag in the form of a double compartment structure permits attachment of auxiliary objects at the folding axis indicated at 37. Such an object may be an umbrella, a package or roll of paper, and the like. In order to secure such an object firmly in place I have provided an additional strap 45 shown in Fig. 2. This strap is attached to the uninterrupted wall of the bag at one end, and at its free end carries a fastener 46, for coaction with fasteners 47, 48, 49. If desired, the strap 45 may be made of elastic material. A plurality of such auxiliary straps may be provided, e. g., two straps, one near each end of the bag.

Fasteners, including those shown at 45, 38—39 and 40—41, may also be used for securing the bag in place when it is used as a carrier of a robe or blanket and folded over a hand rail as explained before.

The above described features indicate the versatility and adaptability of the new bag. The various forms of use indicated above are nevertheless merely adaptations and possibilities derived from the original thought for which the bag has been particularly designed, namely, for use in connection with the handling of vehicles, e. g., baby carriages, as a storage bag for auxiliaries such as blankets, bedding, etc., during rest periods, and if need arises, during periods of actual manipulation of the carriage in cold weather, as a protective muff and windbreaker or shield for the hands.

The bag, after removal of articles that may have been stored therein for periods of non-use, is folded over the handle or steering bar of the baby carriage, as shown in Figs. 3 and 4, and may be elastically secured thereto, at the folding axis, by straps such as 45. The wall member which is folded over the handle 37 forms a protective sheathing therefor. The two sections depending from the sheathing, forming the compartments 42—43, are held together by means of the fasteners 38, 39 and 40, 41. The free end of the strap 28 is relatively loosely attached to one or the other, or to both of the fasteners 35, 36, by means of its fasteners 31, 32. The cover flap 12 is left in the open position shown in Figs. 3 and 4 and forms a shield. Desired articles, e. g., for personal use, may be placed in the pockets now formed by the bag and depending in front of and in back of the handle bar 37. The attachment is extremely simple and yet secure against any contingency that may normally be expected to arise.

The hands are inserted under the centrally loosely secured cover flap 12 forming the shield, the fingers being inserted in the compartment or pocket 42 and the thumbs in the compartment or pocket 43. The cover flap functions as a shield and as a windbreaker and protective covering for the hands and wrists.

The inside of the bag and the inside of the cover flap forming the shield may be provided with any desired and suitable lining, for example, fur. It is understood, of course, that inside pockets or the like may be provided in the bag compartments, as may be desired or necessary for any special use.

One of the advantages resulting from the new structure resides in the fact that the bag interposes a sheathing or cover between the hands and the handle bars. Such bars are usually made of metal and require protection for comfortable handling. The new bag furnishes such protection in a simple and convenient manner.

I have described in the foregoing a preferred form of making and using the bag, and have indicated additional uses to which the invention may be put. The description furnished above is, however, not intended to exhaust either the possibilities inherent in structural aspects of the invention or the possibilities regarding its functions or uses.

The new bag may be made in any desired size. Details may be modified, and refinements known in the art may be added as desired.

Changes may be made within the scope and spirit of the appended claims in which I have defined what I consider new and desire to have protected by Letters Patent of the United States.

I claim as my invention:

1. A utility bag of the class described having a sheet member folded upon itself in such a manner as to form a compartment comprising two contiguous sections, one end of said sheet member being disposed in fixed folded position with respect to the body portion thereof to form one of said compartment sections, the body portion of said sheet member being folded upon itself and secured in fixed folded position to form said other compartment section, and the other end of said sheet member being disposed in overlapping relationship relative to said first-named fixedly folded end and forming therewith an opening for gaining access to said compartment sections and a closure therefor, and means for removably fastening said overlapping end of said sheet member in engagement with said first-named end thereof.

2. The structure defined in claim 1, together with a fastener secured to said overlapping closure end of said sheet member, and means for securing such fastener in engagement with the body portion of said sheet member.

3. The structure defined in claim 1, wherein said opening extends in a transverse direction along the edge of said first-named fixedly folded end of said sheet member, together with additional coacting fastener means disposed on the body portion of said sheet member, said additional fastener means being constructed and arranged for holding said sheet member in folded relationship along the general plane of said opening to dispose said compartment sections side by side so as to form a pair of pockets extending substantially in parallel relation with each other, with both pockets terminating in said opening.

4. The structure defined in claim 1, wherein said opening extends in a transverse direction along the edge of said first-named fixedly folded end of said sheet member, together with additional coacting fastener means disposed on the body portion of said sheet member, said additional fastener means being constructed and arranged for holding said sheet member in folded relationship along the general plane of said opening to dispose said compartment sections side by side so as to form a pair of pockets extending substantially in parallel relation with each other, with both pockets terminating in said opening, an additional fastener extending from the fixedly folded end of said sheet member, and coacting means for securing the free end of such additional fastener in engagement with the body position of said sheet member.

5. A utility bag for use as an auxiliary in connection with baby carriages and the like comprising a sheet member folded upon itself about the handle of a baby carriage and forming a pair of pockets depending therefrom for receiving and protecting the hands in manipulating said handle, fastening means for securing said pockets back to back in position on said handle, a cover flap formed by said sheet member at one end thereof and extending from said pockets, said cover flap acting in the manner of a windbreaker above the hands inserted in said pockets, and means for fastening said cover flap.

6. In combination with the handle of a baby carriage, a muff bag adapted to surround said handle comprising a sheet member adapted to be folded directly about such handle, said sheet member being folded upon itself to form a pair of hand receiving pockets depending from said handle and terminating in a common opening located above said handle, means for securing said pockets back to back, a cover flap formed by one end of said sheet member and disposed above said opening, and means for securing said cover flap in position, said cover flap acting in the manner of a windbreaker above the hands inserted in said pockets.

7. A utility bag adapted for use as a muff for removable attachment to the handle of a baby carriage having a sheet member forming a wall which is adapted to be folded directly about such handle, coacting wall members folding upon said wall and forming pockets therewith which depend from said handle, for receiving the hands in manipulating such handle, a cover flap extending from one of said wall members for protecting the hands from above, and means for fastening said cover flap in position above the hands.

8. A utility bag adapted for use in the manner of a muff for removable attachment to the handle of a vehicle, such as a baby carriage, having a sheet member forming a pliable covering which is adapted to be folded directly about such handle forming a protective sheathing thereon, means for securing such sheathing in position, means forming coacting wall members adapted to fold upon said sheathing and forming pockets therewith which depend from said handle, for receiving and protecting the hands in manipulating such handle, a shield extending from one of said wall members for protecting the hands from above, and means for fastening said shield in position.

HANS DEUTSCH.